United States Patent [19]
Dietrich

[11] Patent Number: 6,164,030
[45] Date of Patent: Dec. 26, 2000

[54] FIXED VACUUM INSULATION PANEL

[75] Inventor: Karl Werner Dietrich, Odenthal, Germany

[73] Assignee: Bayer Aktiengesellschaft, Leverkusen, Germany

[21] Appl. No.: 08/899,494

[22] Filed: Jul. 19, 1997

[30] Foreign Application Priority Data

Jul. 29, 1996 [DE] Germany ............... 296 13 093 U

[51] Int. Cl.[7] ................................. F25D 23/06
[52] U.S. Cl. .................. 52/406.2; 52/406.3; 52/407.2
[58] Field of Search ................. 52/406.1, 406.2, 52/406.3, 407.2, 784.15; 312/400, 406

[56] References Cited

U.S. PATENT DOCUMENTS

| | | | |
|---|---|---|---|
| 3,264,165 | 8/1966 | Stickel | 52/406.2 X |
| 4,005,919 | 2/1977 | Hoge et al. | 312/406 |
| 4,297,082 | 10/1981 | Wurtz et al. | 417/51 |
| 5,007,226 | 4/1991 | Nelson | 52/407.2 X |
| 5,018,328 | 5/1991 | Cur et al. | 52/406.2 |
| 5,032,439 | 7/1991 | Glicksman et al. | 428/44 |
| 5,260,344 | 11/1993 | Ashida et al. | 521/131 |
| 5,263,773 | 11/1993 | Gable et al. | 312/406 |
| 5,376,424 | 12/1994 | Watanabe | 52/406.3 X |
| 5,512,345 | 4/1996 | Tsutsumi et al. | 52/404.1 X |
| 5,532,034 | 7/1996 | Kirby et al. | 52/406.2 X |
| 5,683,799 | 11/1997 | Olinger | 428/313.9 |
| 5,693,685 | 12/1997 | Kishimoto et al. | 521/130 |
| 5,855,424 | 1/1999 | Hamilton et al. | 312/408 |

FOREIGN PATENT DOCUMENTS

| | | |
|---|---|---|
| 434225 | 6/1991 | European Pat. Off. . |
| 437930 | 7/1991 | European Pat. Off. . |
| 715138 | 6/1996 | European Pat. Off. . |
| 44 39 328 | 5/1996 | Germany . |
| 44 39 331 | 5/1996 | Germany . |
| 96/39894 | 12/1996 | WIPO . |

OTHER PUBLICATIONS

Patent Abstracts of Japan, vol. 018, No. 550 (M–1690), Oct. 20, 1994 & JP 06 194030 A (Matsushita Refrig Co Ltd), Jul. 15, 1994.

*Primary Examiner*—Richard Chilcot
*Attorney, Agent, or Firm*—Joseph C. Gil; Lyndanne M. Whalen; Diderico Van Eyl

[57] ABSTRACT

An apparatus is described which consists of a rigid plate and a vacuum insulation panel, in which the vacuum insulation panel is fixed to the rigid plate by a polyurethane foam applied as a liquid reaction mixture, wherein the vacuum insulation panel contains open-cell rigid plastics foam and/ or open-cell rigid plastics foam recyclate. A refrigerated cabinet element containing said apparatus is additionally described.

13 Claims, 6 Drawing Sheets

▨ foam strip

☰ vacuum insulation panel

☐ rigid top layer

▨ foam strip

▤ vacuum insulation panel

▨ metal cassette (rigid top layer)

▨ foam strip

☰ vacuum insulation panel

☐ rigid top layer

▧ foam strip

☰ vacuum insulation panel

▨ metal cassette (rigid top layer)

◎ tube

VACCUUM INSULATION PANEL

FOAM STRIP

RIGID PLATE HAVING IRREGULAR SURFACE

FIXED VACUUM INSULATION PANEL

BACKGROUND OF THE INVENTION

Vacuum insulating panels are used conventionally for thermal insulation. Known vacuum insulating panels consist of a pre-compressed porous filling, a porous pressboard or an open-cell rigid foam as substrate, which is enveloped by a gas-tight film, wherein the film is heat-seated or bonded after the evacuation.

The following, for example, are used as filling materials for vacuum insulating panels: precipitated and dried silicas, silica gels, fly ash, open-cell foams on an organic base such as open-cell rigid polyurethane foams or bonded rigid polyurethane foam paste, which are described in DE 4,439,331 and DE 4,439,328.

Vacuum insulating panels of this type are used in the manufacture of cold rooms, e.g., refrigerators or refrigerated containers, with the latter being inserted between the outer and inner casing and the gap left between the outer and inner casing being filled with foam.

The fitting of the vacuum insulation panels into refrigerator casings nevertheless presents problems. According to the current state of the art, they are bonded onto a plate—for example, a metal cassette—by means of a double-sided adhesive film. This combination plate can then be processed further into a sandwich panel, for example, a refrigerator door, wherein the cavity left is conventionally filled with foam.

As a result, on the one hand, a complicated, multi-step process is required, and on the other hand, the insulation volume is affected by the foam, which is less efficient in insulation terms when compared with a vacuum insulation panel. Arrangements of this type are also, to only a limited extent, without thermal bridges.

These disadvantages can be prevented if the vacuum insulation panel is fixed with a polyurethane foam strip, which is applied as a liquid reaction mixture—preferably peripherally—at the edge of the vacuum insulation panel on the rigid top layer or between two rigid top layers.

SUMMARY OF THE PRESENT INVENTION

The present invention is directed to an apparatus consisting of a rigid plate and a vacuum insulation panel, wherein the vacuum insulation panel is fixed to the rigid plate by the application of a polyurethane foam as a liquid reaction mixture. Additionally, the present invention is directed to a refrigeration cabinet element comprising the above-mentioned apparatus.

DETAILED DESCRIPTION OF THE INVENTION

Figure 4:
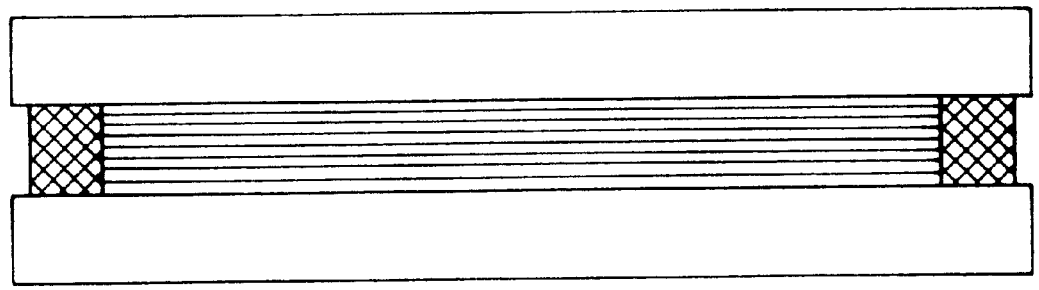
FIG. 4: A side plan view of the apparatus according to the present invention, in which the vacuum insulation panel is fixed between 2 rigid top layers.

The vacuum insulation panel is fixed to the rigid plate, e.g., a metal plate or plastics plate of ABS or polystyrene, by the vacuum insulation panel being placed on the rigid plate and a liquid polyurethane foam reaction mixture being added around the vacuum insulation panel, wherein the foam adheres both to the plate and to the vacuum insulation panel during the foaming and setting and thus, bonds the vacuum insulation panel with the plate. The vacuum insulation panel is thereby advantageously anchored to the plate firmly and without thermal bridges in a very simple manner. Preferably, as shown in FIG. 4, a metal cassette is preferably used as the rigid plate.

Optionally, the foam reaction mixture can also be first applied and the vacuum insulation panel can then be introduced into the still liquid reaction mixture. According to the present invention, a plate with an irregular surface, e.g., an evaporator plate of a refrigeration unit or a profiled sheet, is also combined, simply and economically, with a vacuum insulation panel.

Figure 1:
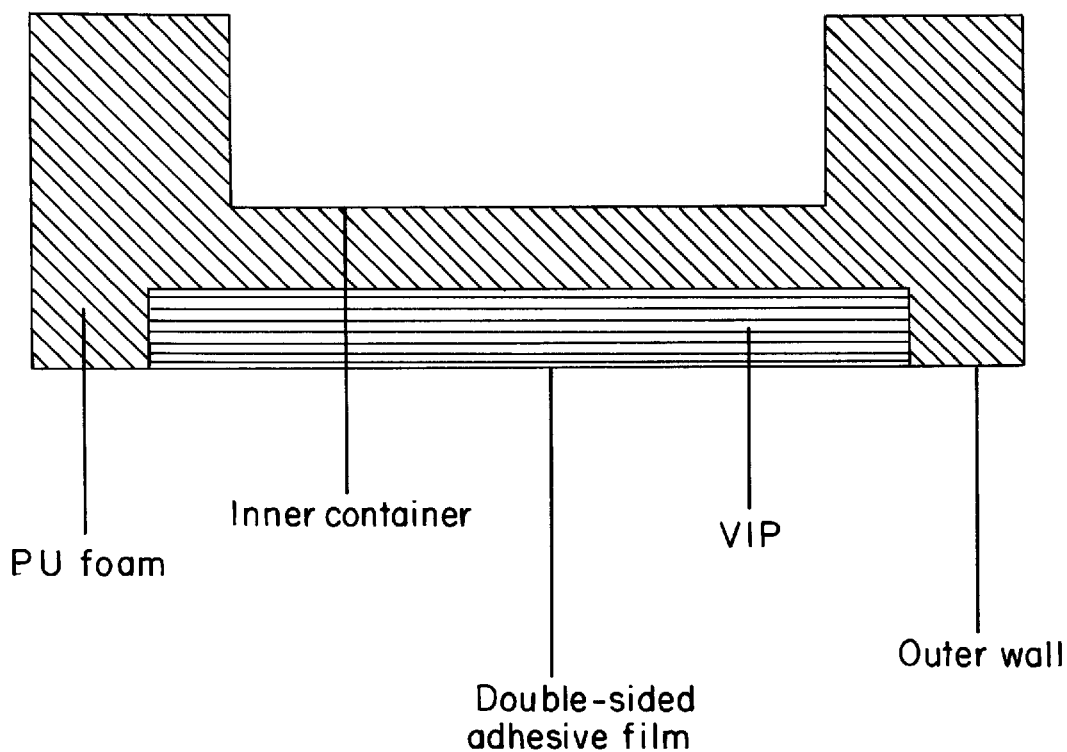
FIG. 1: A plan view showing an apparatus according to the prior art (VIP=vacuum insulation panel)
Figure 2:
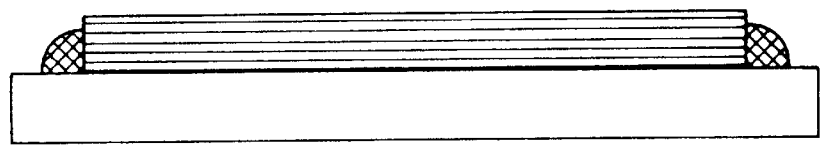
FIG. 2A: A top plan view of the apparatus according to the present. invention, in which the vacuum insulation panel is fixed by peripheral polyurethane foam strips on a rigid top layer
FIG. 2B: A cross sectional view of the apparatus of FIG. 2A taken along plane A—A of FIG. 2A.
Figure 2:
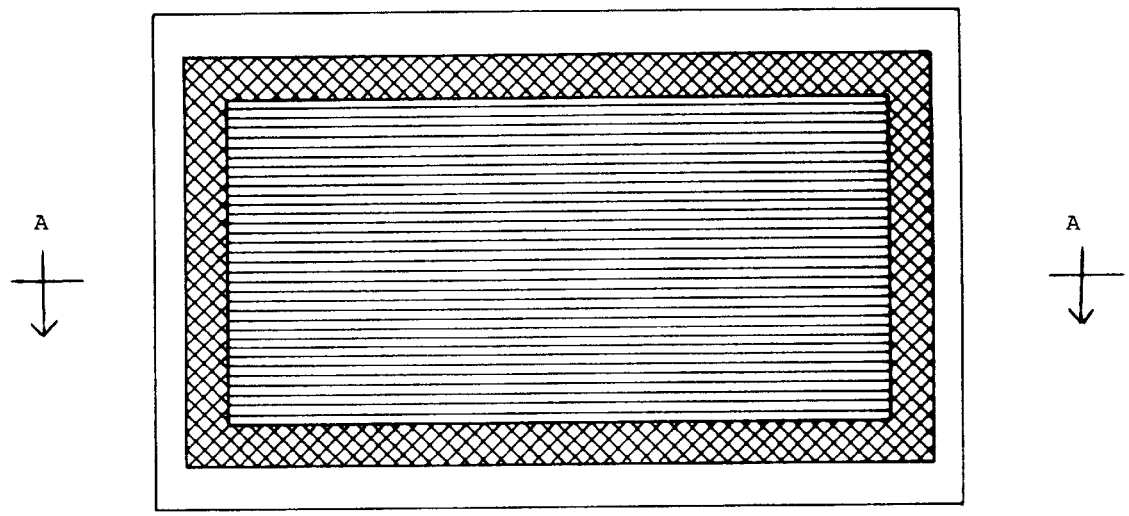
Figure 3B:
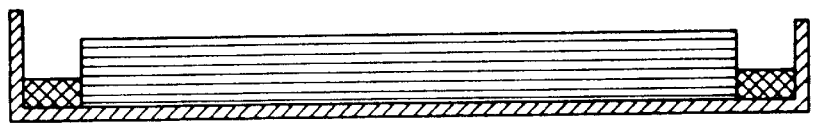
FIG. 3B: A cross sectional view of the apparatus of FIG. 3A taken along plane B—B of FIG. 3A.
Figure 3:
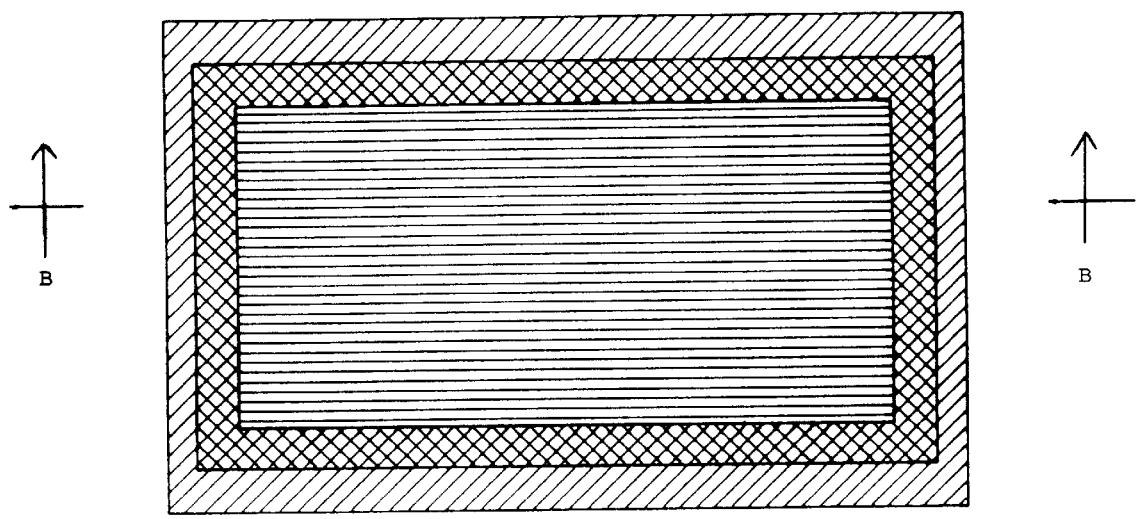
FIG. 3A: A top plan view of the apparatus according to the present invention comprising a metal cassette as a rigid top layer.

According to the present invention, the vacuum insulation panel can also be fixed between rigid plates in a sandwich construction (FIG. 3). Additionally, rigid plates of open-cell recyclate may be advantageously used for the vacuum insulation panel. Accuracy of fit, dimensional accuracy and evenness of the vacuum insulation panel are ensured in this manner.

Polyurethane foam reaction mixtures can be used for the fixing of the vacuum insulation panel to the rigid plate. All polyurethane foam reaction mixtures, which are commonly used per se, are conventional in refrigerated cabinet construction. One-component polyurethane foams are preferably used, e.g., ASSIL®(Henkel).

Figure 5:
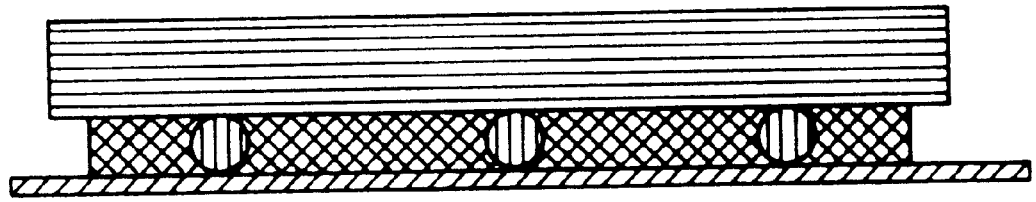
FIG. 5A: A side plan view of the apparatus according to the present invention with a refrigerant-evaporator unit.
FIG. 5B: A side plan view of the apparatus according to the present invention with a refrigerant-evaporator unit wherein foam is filled within.
Figure 5:
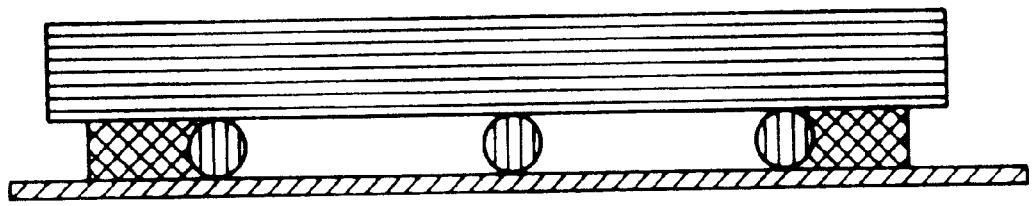
Figure 6:
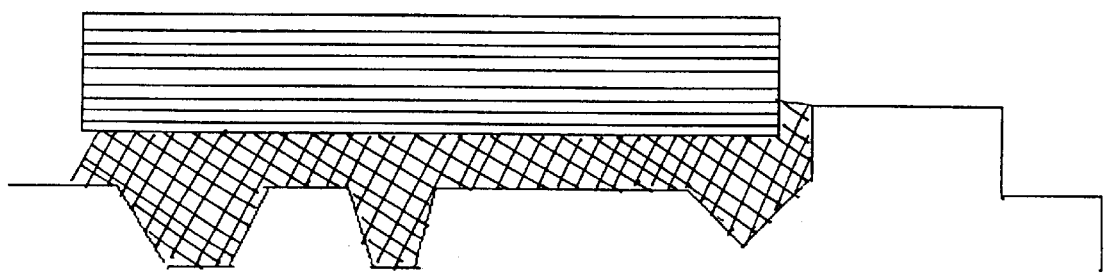
FIG. 6 A side plan view of the apparatus according to the present invention wherein the rigid plate comprises an irregular surface.
Figure 6:
Figure 6:
Figure 6:

The present invention further provides a refrigerated cabinet element which contains a vacuum insulation panel fixed to a rigid plate with a liquid polyurethane foam reaction mixture. Refrigerated cabinet elements of this type according to the present invention can be used as refrigerated cabinet sides or rear or upper parts. In addition, a vacuum insulation panel can also be fixed to an evaporator (FIG. 5).

The following examples are intended to explain the invention in greater detail, but without limiting it in its scope:

EXAMPLES

Example 1

Manufacture of a vacuum insulation panel.

A plate having the dimensions of 800×500×25 mm of open-cell rigid PU foam with a gross density of 60 kg/m$^3$ is welded under vacuum (0.5 mbar) into a film bag consisting of a 3-ply complex (polyester, aluminium, polyethylene). The vacuum insulation panel, which is manufactured, has a thermal conductivity λ of 10 mW.

Example 2

Vacuum insulation panel fixed in a metal cassette.

A vacuum insulation panel having the dimensions of 540×740×20 mm is introduced into the axially-aligned center of a steel cassette having the dimensions of 600×800 mm with an edge crimped over by 30 mm (cf. drawing 3). The peripheral, 30 mm wide gap is filled with a one-component polyurethane foam. The vacuum insulation panel is thereby anchored firmly and without thermal bridges.

Example 3

Vacuum insulation panel fixed to an aluminium plate.

5 mm thick aluminium tubes are welded in a coil shape onto an aluminium plate having the dimensions of 400×500×0.5 mm. On the side of the sheet to which the pipes are welded, is placed a polyurethane reaction mixture consisting of 100 parts by weight (PW) of a glycerol-sucrose co-started polyether of OH number 400, 2 PW of water, 10 PW of cyclopentane, 2 PW of dimethylcyclohexylamine and 100 PW of polymer MD. During the foaming process, a vacuum insulation panel with the same dimensions as the aluminium plate is placed on the rising reaction mixture. After the setting of the foam, the latter has bonded the plate covered with the aluminium tubes firmly with the vacuum insulation panel.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus comprising a rigid plate and a vacuum insulation panel, said vacuum insulation panel comprising open-cell rigid plastics foam and/or open-cell rigid plastics foam recyclate and is fixed to said rigid plate by the application of a polyurethane foam as a liquid reaction mixture, wherein said plastics foam is applied between said vacuum insulation panel and said rigid plate.

2. An apparatus according to claim 1, wherein said rigid plate is a metal cassette.

3. An apparatus according to claim 1, wherein said polyurethane foam is a one-component polyurethane foam.

4. An apparatus according to claim 1, wherein said vacuum insulation panel contains porous silica.

5. An apparatus according to claim 1, wherein said vacuum insulation panel contains mineral fibers.

6. An apparatus according to claim 1, wherein said vacuum insulation panel contains rigid polyurethane foam and/or bonded rigid polyurethane foam recyclate.

7. A refrigerated cabinet element comprising a rigid plate and a vacuum insulation panel, said vacuum insulation panel comprising open-cell rigid plastics foam and/or open-cell rigid plastics foam recyclate and is fixed to said rigid plate by the application of a polyurethane foam as a liquid reaction mixture, wherein said plastics foam is applied between said vacuum insulation panel and said rigid plate.

8. A refrigerated cabinet element according to claim 7 wherein said rigid plate is a metal cassette.

9. A refrigerated cabinet element according to claim 7 wherein said polyurethane foam is a one-component polyurethane foam.

10. A refrigerated cabinet element according to claim 7, wherein said vacuum insulation panel contains porous silica and contains a refrigerant-evaporator unit.

11. A refrigerated cabinet element according to claim 7, wherein said refrigerated cabinet element consists of a refrigerated cabinet door.

12. An apparatus according to claim 1, wherein said rigid plate comprises an irregular surface.

13. A refrigerated cabinet element according to claim 7, wherein said rigid plate comprises an irregular surface.

* * * * *